United States Patent [19]

Cornelis

[11] Patent Number: 5,644,362

[45] Date of Patent: Jul. 1, 1997

[54] TELEVISION RECEIVER INCLUDING A TELETEXT DECODER FOR SELECTIVELY CHOOSING A PARTICULAR TELETEXT BROADCAST

[75] Inventor: Ronny M. P. Cornelis, Eindhoven, Netherlands

[73] Assignee: U.S. Philips Corporation, New York, N.Y.

[21] Appl. No.: 668,307

[22] Filed: Jun. 26, 1996

Related U.S. Application Data

[63] Continuation of Ser. No. 415,780, Apr. 3, 1995, abandoned, which is a continuation of Ser. No. 303,543, Sep. 9, 1994, abandoned, which is a continuation of Ser. No. 79,295, Jun. 17, 1993, abandoned.

[30] Foreign Application Priority Data

Jun. 29, 1992 [EP] European Pat. Off. ............. 92201924

[51] Int. Cl.⁶ .......................... H04N 7/08; H04N 7/087
[52] U.S. Cl. .................... 348/468; 348/465; 348/467
[58] Field of Search ..................... 348/461, 465, 348/467, 468, 589; H04N 7/02, 7/087, 5/262, 5/278

[56] References Cited

U.S. PATENT DOCUMENTS

| | | | |
|---|---|---|---|
| 4,413,281 | 11/1983 | Thonnart | 358/147 |
| 4,701,794 | 10/1987 | Froling et al. | 358/147 |
| 4,991,017 | 2/1991 | Raaijmakers | 358/147 |
| 4,992,871 | 2/1991 | Bensch et al. | 348/468 |
| 5,373,324 | 12/1994 | Kuroda et al. | 348/468 |
| 5,410,359 | 4/1995 | Odijk et al. | 348/468 |

FOREIGN PATENT DOCUMENTS

| | | | |
|---|---|---|---|
| 63-189077 | 8/1988 | Japan | H04N 7/08 |
| 1-126086 | 5/1989 | Japan | H04N 7/08 |
| 3-106281 | 5/1991 | Japan | H04N 7/08 |
| 5-64163 | 3/1993 | Japan | H04N 7/08 |

*Primary Examiner*—John K. Peng
*Assistant Examiner*—John W. Miller
*Attorney, Agent, or Firm*—David L. Schreiber

[57] ABSTRACT

A television receiver including a teletext decoder is adapted to search and display a teletext subtitling page in response to a display command supplied for this purpose. If there are more subtitling pages, their page numbers are stored in a memory from which they can be selectively requested. For each receivable television station the page number used by said station is fixed in a non-volatile memory.

12 Claims, 6 Drawing Sheets

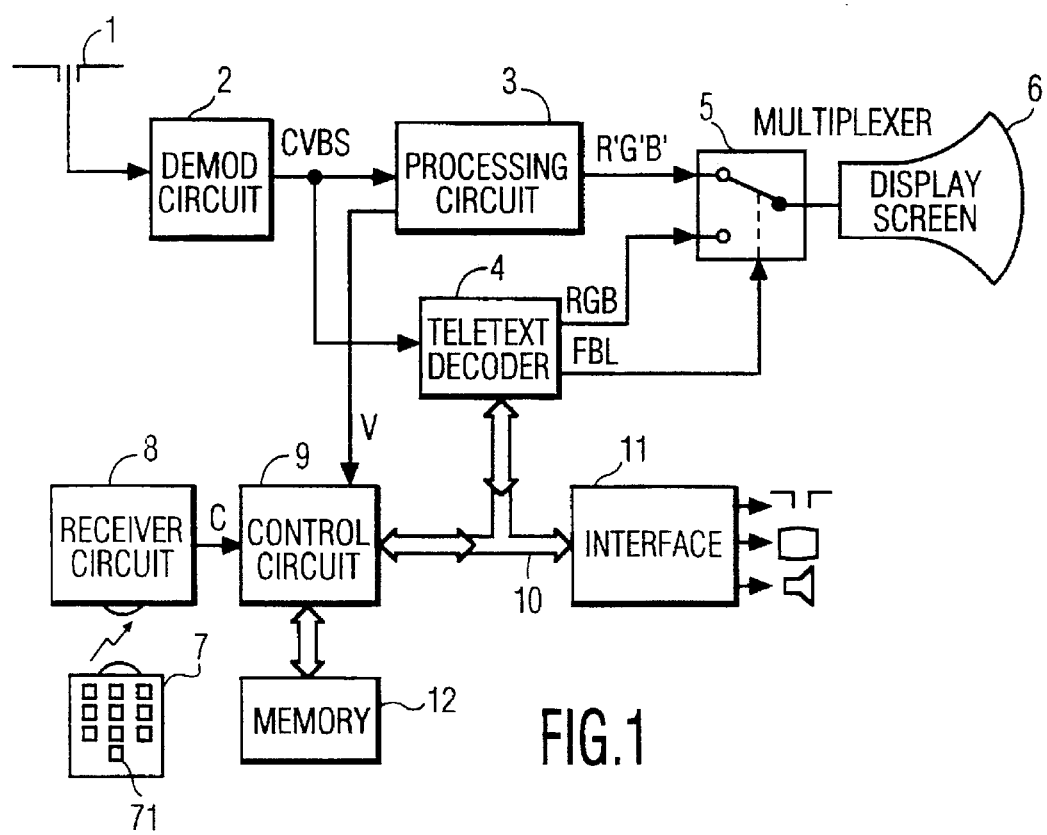
FIG.1
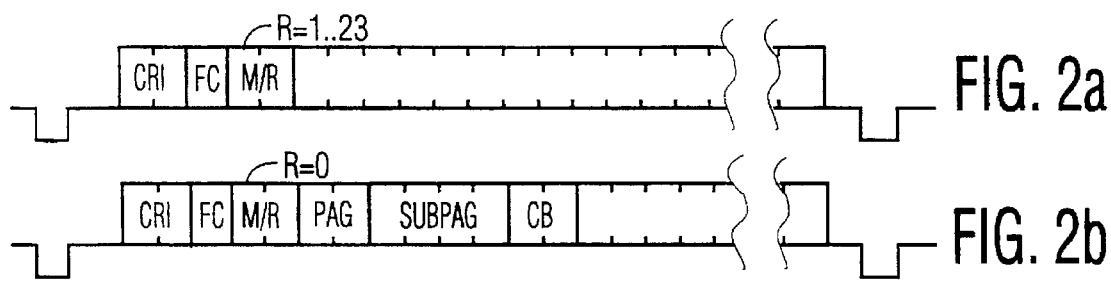
FIG. 2a
FIG. 2b
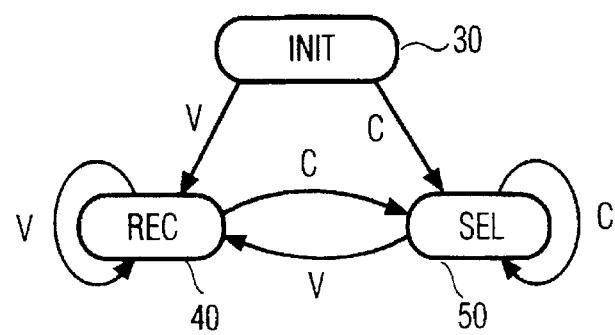
FIG.4

TELEVISION RECEIVER INCLUDING A TELETEXT DECODER FOR SELECTIVELY CHOOSING A PARTICULAR TELETEXT BROADCAST

This is a continuation of application Ser. No. 08/415,780, filed Apr. 3, 1995, abandoned, which is a continuation of Ser. No. 08/303,543 filed Sep. 9, 1994, abandoned which is a continuation of Ser. No. 08/079,295 filed Jun. 17, 1993 abandoned.

FIELD OF THE INVENTION

The invention relates to a television receiver including a teletext decoder. Such a receiver may be a television apparatus but also, for example a video recorder.

DESCRIPTION OF THE PRIOR ART

Television receivers including a teletext decoder are generally known. Dependent on the programs offered by television stations, a large variety of information such as news, weather forecasts, TV programs, sports results, exchange rates, regional information, entertainment information, etc. can be consulted with such a television receiver. The information is accommodated in a plurality of teletext pages which are transmitted in the form of a cyclic series by the television station.

More particularly, teletext provides the possibility of facultatively subtitling television programs. To this end, the subtitles are accommodated in a teletext page. Such a subtitle comprises the lower text rows of a page. The part of the text rows to be displayed is marked by means of a box code inserted at both sides. Moreover, a control bit (subtitling indicator) forming part of the teletext page is set. For the teletext decoder this control bit means that only the part of the page which is between the box codes is to be displayed. The rest of the display screen shows the television program. The necessary synchronization with the television program is achieved by transmitting the teletext page with the actual subtitle each time at the correct instant, thereby interrupting the cyclic series for a moment.

The user requests access to the subtitling service by entering the page number of the subtitling page. This presents the problem that the user should know the page number, for example, from the TV program guide or by means of an auditive and/or visual announcement in the television program. If the user does not know the number, he cannot have access to the subtitling service. Fortunately, substantially all stations use a fixed page number for teletext subtitling. However, this does not solve the problem for the user who can receive television programs from many countries, because the various countries use different numbers. For example, the United Kingdom currently uses page 888 and Germany uses page 150. There is a TV manufacturer who has provided his apparatuses with a subtitle key with which the page number of the subtitling page is selected automatically. This simplifies the activation of the subtitling operation. The relevant page number is, however, fixed in the apparatus and applies to one country only. Moreover, it loses its validity if said country introduces a different teletext page for subtitling.

There is a further problem if a plurality of subtitling pages is transmitted by one station. An example is the subtitling of a television program in several languages, both in the native language (as is common practice for the benefit of heating-impaired people) and in other languages (for example, for foreign-language minorities). Another example is a situation as occurs, for example in the Netherlands where the three national television stations transmit a common file of teletext pages. In this file page 199 is the subtitling page for television programs on station NL1, page 299 for television programs on station NL2 and page 399 for television programs on station NL3. The user must remember a plurality of page numbers and always realise which station he has tuned to.

SUMMARY OF THE INVENTION

It is an object of the invention to provide a television receiver including a teletext decoder in which said problems are met in a user-friendly way.

To this end the receiver according to the invention is characterized in that it is provided with recognition means for identifying transmitted teletext subtitling pages, and selection means for selecting and displaying the identified subtitling page in response to a display command. It is thereby achieved that the subtitling page is automatically displayed if the user generates the relevant display instruction. This instruction is obtained, for example by depressing a subtitle key or by making a choice from an operation menu. The user need not know and enter the page number. Neither does it make any difference to him which station the receiver is tuned to and whether the station uses a fixed page number for subtitling.

In a possible embodiment of the receiver the recognition means are adapted to detect a subtitling indicator of the transmitted teletext pages and to fix, upon detection, the corresponding page number and store said page number in a memory for the purpose of selection. "Scanning" of the transmitted pages for the presence of the subtitling indicator, which takes some time, may take place in the normal operating state of the receiver. As soon as the subtitle key is depressed, it is most likely that the page number has been stored so that the subtitling page can be acquired immediately.

If a plurality of subtitling page numbers appears to be used, they can be selectively read from the memory and applied to the teletext decoder in a further embodiment. A first touch of the subtitle key yields, for example page 199, the subtitling page of station NL1. When the user is watching station NL3 and notices that the subtitling does not belong to the television program, a further touch of the key is sufficient to acquire page 299 and subsequently page 399 with the desired subtitling.

In a further embodiment of the receiver the recognition means are adapted to allocate a priority indication to the page number of a subtitling page having a predetermined repetition frequency. The selection means are adapted to first apply the page number with the priority indication to the teletext decoder. This has the following reason. If a television program is not subtitled, the station nevertheless transmits the relevant teletext page, but only once in the cyclic series. The page then has a static content, for example an announcement of the next television program which will be subtitled. If only the program on station NL3 is subtitled, the receiver will now actually display the active subtitling page 399 as the first page because the static subtitling pages 199 and 299 are received only once per cycle of, for example 30 seconds. The repetition frequency can be determined by measuring the number of consecutive receptions of the page in a predetermined time interval.

In a further embodiment of the receiver the selection means are adapted to store the page number of a displayed subtitling page in a further memory in response to a storage signal and to first apply said page number to the teletext decoder in response to the display command. In a favorable embodiment this storage is effected automatically as soon as a subtitling page is displayed for at least a predetermined period of time. If, for example a television program is subtitled in several languages and if the user selects his native language by viewing the other languages for only a short period of time, the page number with the native language will later be called as the first page upon a subsequent subtitling request. This page number is preferably stored separately for each station in a non-volatile memory. In this way a television receiver is obtained which is automatically and adaptively programmed per station in conformity with its owner's viewing behavior.

BRIEF DESCRIPTION OF THE FIGURES

FIG. 1 shows the general structure of a television receiver including a teletext decoder according to the invention.

FIG. 2 shows some possible formats of teletext data packets to be processed by the teletext decoder shown in FIG. 1.

FIGS. 4–9 show flow charts of a control program performed by a control circuit shown in FIG. 1.

DESCRIPTION OF EMBODIMENTS

Figure 3:
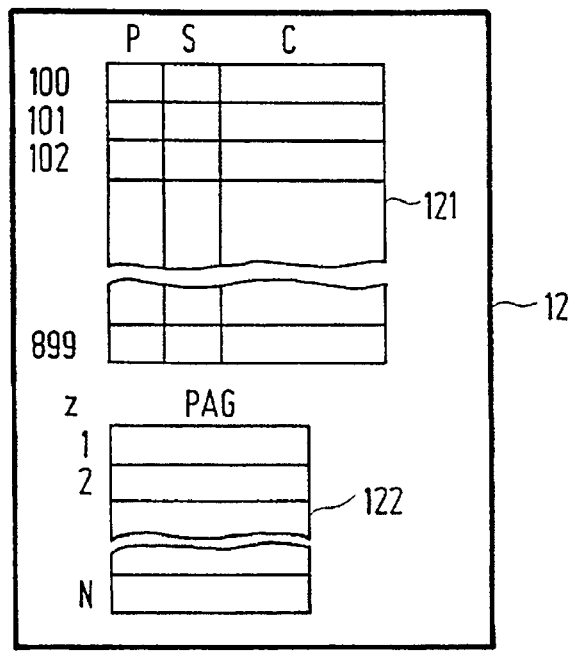
FIG. 3 shows a possible division of a memory shown in FIG. 1.

FIG. 1 shows the general structure of a television receiver including a teletext decoder according to the invention. The transmitter signals received at an antenna 1 are applied to a conventional tuning and demodulation circuit 2. The obtained composite video signal CVBS of the selected television program is applied to a video signal processing circuit 3 and to a teletext decoder 4. In a normal television operating state of the receiver color signals R'G'B' are applied from video signal processing circuit 3 via a multiplexer 5 to a display screen 6 to enable the user to watch the received television program. In a teletext operating state, which can be called by the user, color signals RGB from the teletext decoder 4 are displayed on the display screen. The multiplexer 5 is controlled by a blanking signal FBL which is generated by the teletext decoder 4. The television receiver further includes an audio reception and reproducing section (not shown).

Operating instructions given by the user are generated in a remote control unit 7 and applied to a control circuit 9 via a receiver circuit 8. The remote control unit 7 has, inter alia a subtitle key 71. As is usual, the control circuit 9 is a microprocessor. Teletext decoder 4 is connected to this microprocessor by means of a command bus 10. An interface 11 enabling the microprocessor 9 to tune the receiver to stations, control picture brightness and sound volume and the like is connected to this command bus. This is shown by way of the appropriate symbols in the Figure. A memory 12 is also connected to the microprocessor 9.

The composite video signal CVBS comprises one or more picture lines with teletext information in the field flyback interval. As is shown in FIG. 2, such a picture line comprises a data packet of 45 bytes of 8 bits each. The first 2 bytes having a fixed value of 1010..10 are referred to as "clock run-in" and are denoted by CRI in the Figure. The third byte is a "framing code" FC and has also a fixed value. The next 2 bytes comprise a magazine number M and a row number R. The significance of the other 40 bytes depends on the value of the row number R. If the row number has one of the values 1–23, as is shown in FIG. 2a, the 40 bytes represent a text row of 40 characters for display on a display screen. If the row number has the value 0, as is shown in FIG. 2b, the data packet constitutes a page header of a teletext page. Such a page header starts with a part in which page number bits PAG, a sub-page number SUBPAG and a number of control bits CB are accommodated. The remaining part represents characters for display on the display screen. The transmission of a page starts with, and implies, the page header of this page and subsequently comprises the relevant text rows. The page number of the page is formed by the magazine number M and the page number bits PAG of the page header. The page number has 3 digits and ranges between 100 and 899. A series of teletext pages is transmitted in a repetitive cycle. The duration of a cycle is dependent on the number of transmitted pages and is, for example 30 seconds.

The teletext decoder 4 is a decoder which is commercially available, for example type SAA5246 of Philips. The decoder comprises a plurality of acquisition circuits each of which can search a teletext page with a requested page number and store this page in a page memory (not shown). An interesting property of this type of decoder is that a "don't care" page number can be applied to the acquisition circuits, which means that the decoder stores the page received at that moment in the page memory, irrespective of the page number. A further property of said type is that the page memory can be read and written by the microprocessor 9 via the command bus 10. More particularly, the data shown in FIG. 2b, such as the page number and the control bits of a received teletext page, can be read by the microprocessor.

FIG. 3 shows a possible division of the memory 12 (see FIG. 1). It comprises a first section 121 with memory locations enumerated 100 to 899, each corresponding to a page number in the range between 100 and 899. Each memory location i comprises flag bits $P(i)$ and $S(i)$ and a counter $C(i)$. Their significance will be described hereinafter. A second section 122 of the memory comprises for each receivable transmitter z ($z=1, 2, \ldots, N$) a memory location in which a page number $PAG(z)$ can be stored. This section of memory 12 is non-volatile so that the stored data are also preserved after the receiver is switched off.

The operation of the television receiver shown in FIG. 1 is further based on a control program which is performed by the microprocessor 9. As is shown in FIG. 4, this control program comprises an initialization program 30, a recognition program 40 and a selection program 50. The initialization program 30 is performed after the receiver has been tuned to a transmitter. The recognition program 40 is performed after each vertical flyback period of the television signal. To this end the microprocessor receives a vertical synchronizing pulse V from the video signal processing circuit 3 (see FIG. 1). The selection program 50 is performed if a user command C is received from the remote control unit 7.

Figure 5:
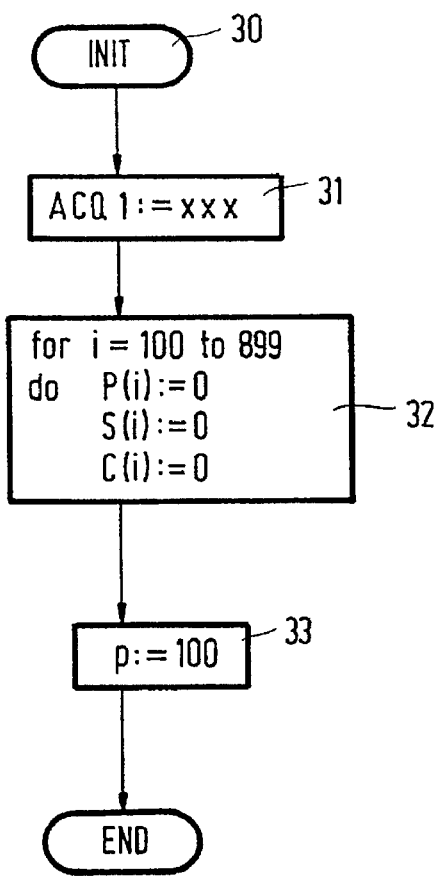

FIG. 5 shows the initialization program 30 in the form of a flow chart. The program comprises a step 31 in which a "don't care" page number xxx is applied to a first acquisition circuit ACQ1 of the teletext decoder. Subsequently, the flag bits $P(i)$ and $S(i)$ are reset in memory 121 (see FIG. 3) in a step 32 and the counter $C(i)$ is set to zero. This applies to all memory locations 100 ... 899. In a step 33 the initial value $p=100$ is allocated to an index p. Its significance will be described hereinafter.

Figure 6:
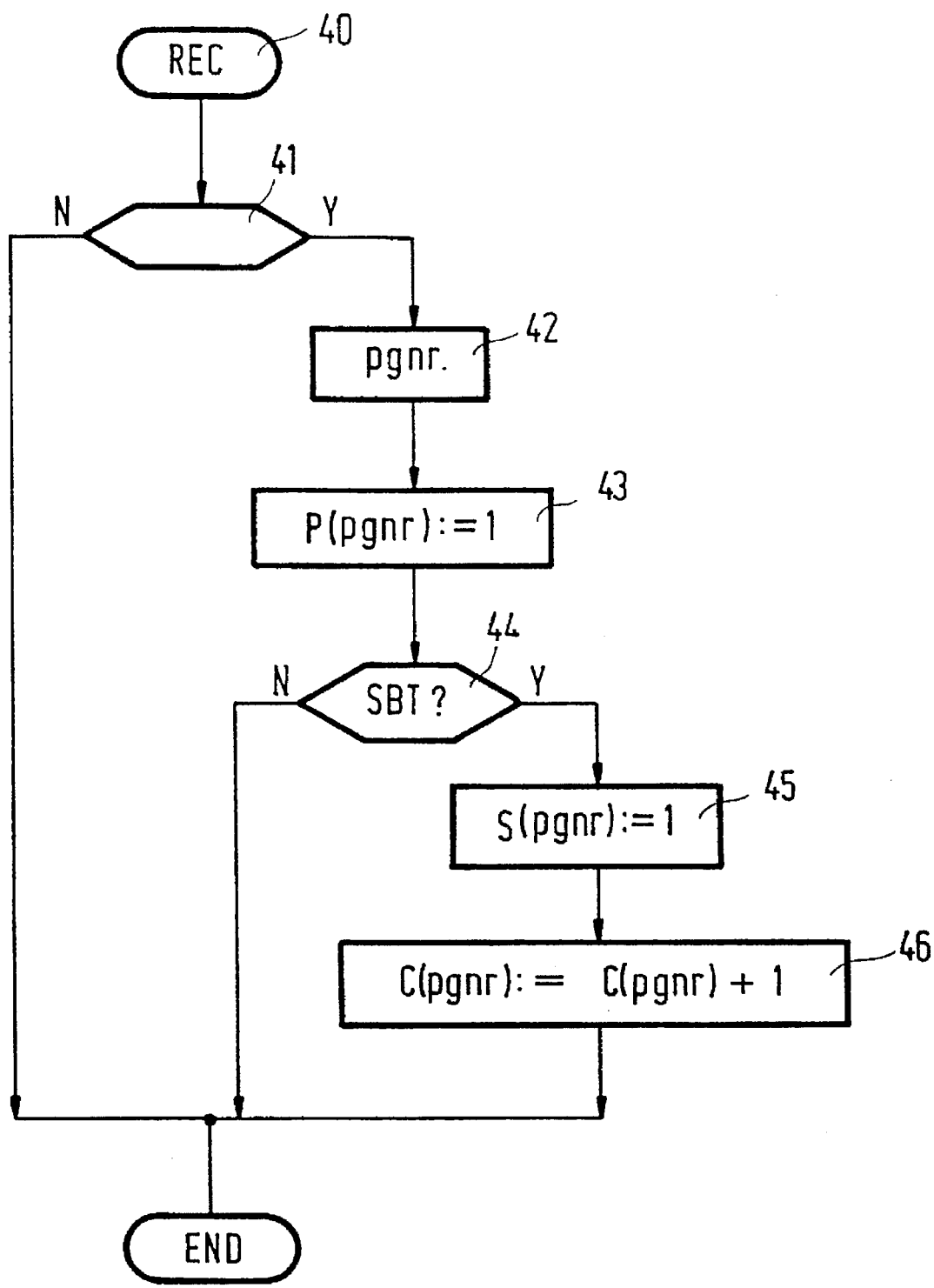

FIG. 6 shows the recognition program 40 in the form of a flow chart, which program is performed after each vertical field flyback period. In a step 41 it is checked whether a new teletext page has been received during the field flyback period. This is the case if a page header has been received and stored by the teletext decoder during the flyback period. In a step 42 the page number accommodated in the page header is read and allocated to an index "pgnr". In a step 43 the corresponding flag bit P(pgnr) is set in memory 121 (see FIG. 3) so as to indicate that this page is present in the transmission cycle. Subsequently, it is checked in a step 44 whether the received page is a subtitling page. To this end the microprocessor reads a subtitling bit SBT which is accommodated in the page header and forms part of the control bits CB shown in FIG. 2b. If the page is a subtitling page, the flag bit S(pgnr) is set in a step 45 and the counter C(pgnr) is raised by 1 in a step 46.

As will be evident, a Table P is composed in this way in the memory 121 (see FIG. 3), which Table indicates for each page number whether the corresponding teletext pages are present in the transmission cycle, and a Table S indicating for each page whether it is a subtitling page or not. Moreover, the counter C records the number of times that the subtitling page is received. It is to be noted that raising the counter C may be dispensed with in a simple embodiment of the recognition program. If desired, raising the counter may be limited to a predetermined period of time of, for example 1 minute. It is also possible to raise the counter only if the subtitle is updated. An "update" indicator in the form of a control bit which is added to each teletext page can be used for this purpose.

Figure 7:
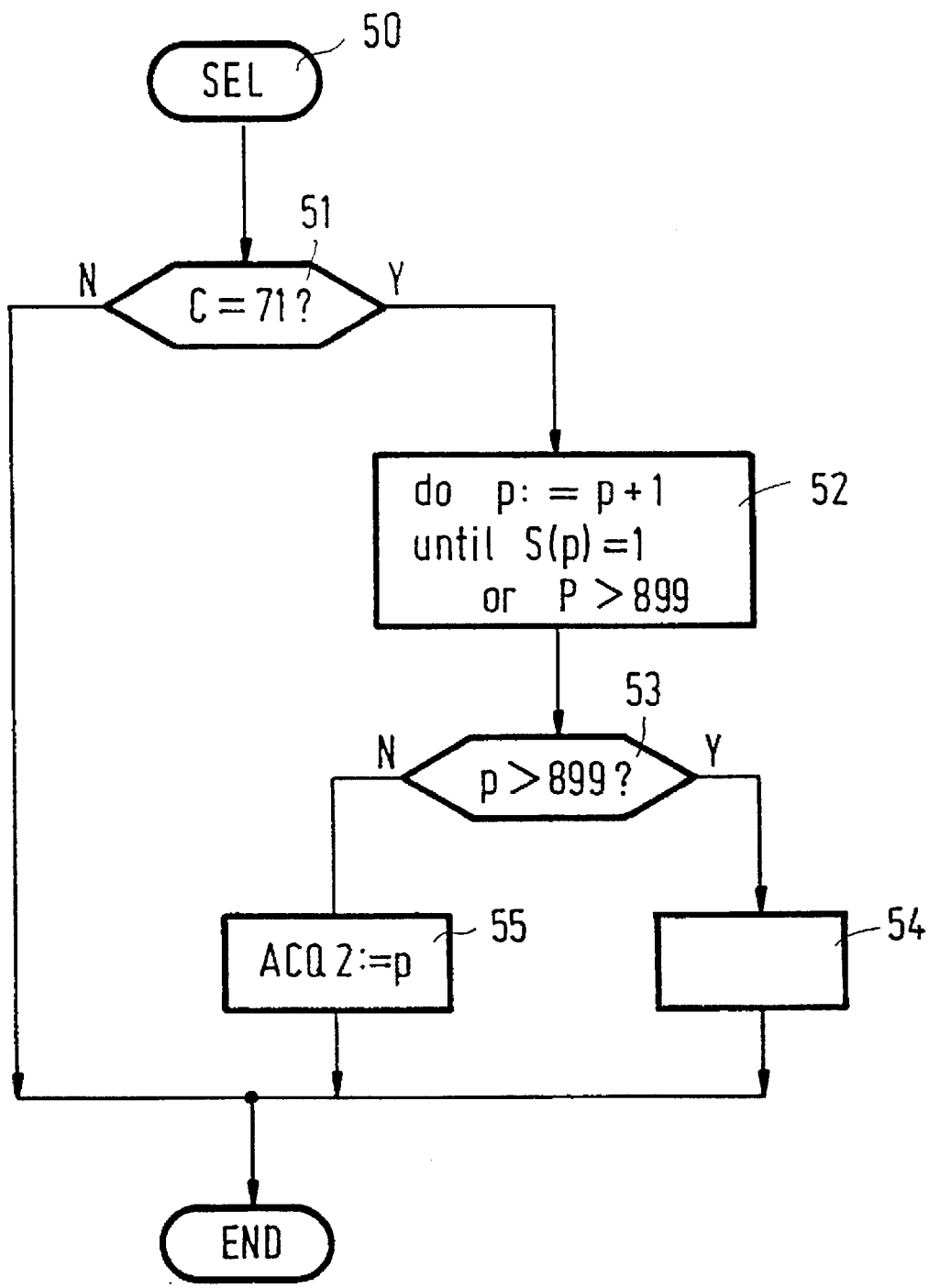

FIG. 7 shows the selection program 50 in the form of a flow chart, which program is performed as soon as a user command C is received from the remote control unit. In a step 51 it is checked which key has been depressed by the user. More particularly it is checked whether the user has depressed the subtitle key 71 (see FIG. 1). If this is not the case, the selection program is terminated, at least no actions are performed which are relevant to the invention. If it is determined in step 51 that the subtitle key has been depressed, it is checked in a step 52 which flag bit S(k) has been set. To this end the index p (which received the initial value of 100 in the initialization program 30) is raised by 1 until S(p)=1 or until p exceeds an upper limit 899. In a step 53 it is checked whether step 52 has been left at p>899 or at S(p)=1. In the first-mentioned case the user is informed in a step 54 that there are no subtitles available. In the last-mentioned case p represents the page number of a subtitling page. In a step 55 this number is applied to a second acquisition circuit ACQ2 of the teletext decoder so that this decoder further acquires the relevant page and displays it on the display screen. The display screen now shows both the television program and the subtitling. The selection program 50 is then terminated.

If the user depresses the subtitle key a second or subsequent time, the selection program 50 is performed again. More particularly, this means that a possibly present further subtitling page is found and displayed in the step 52. For example, if there appear to be three subtitling pages 199, 299 and 399, it is determined in step 52, after the subtitle key has been depressed once, that S(199)=1 and page 199 is displayed. If the subtitle key is depressed a second time, step 52 is performed with p=199 as the initial value so that subsequently S(299)=1 is found and page 299 is displayed. Analogously, page 399 is displayed when the subtitle key is depressed a third time. After the key has been depressed a fourth time, p>899 and the user is informed in step 54 that there are no further subtitles available and/or the subtitling mode is left.

Figure 8:
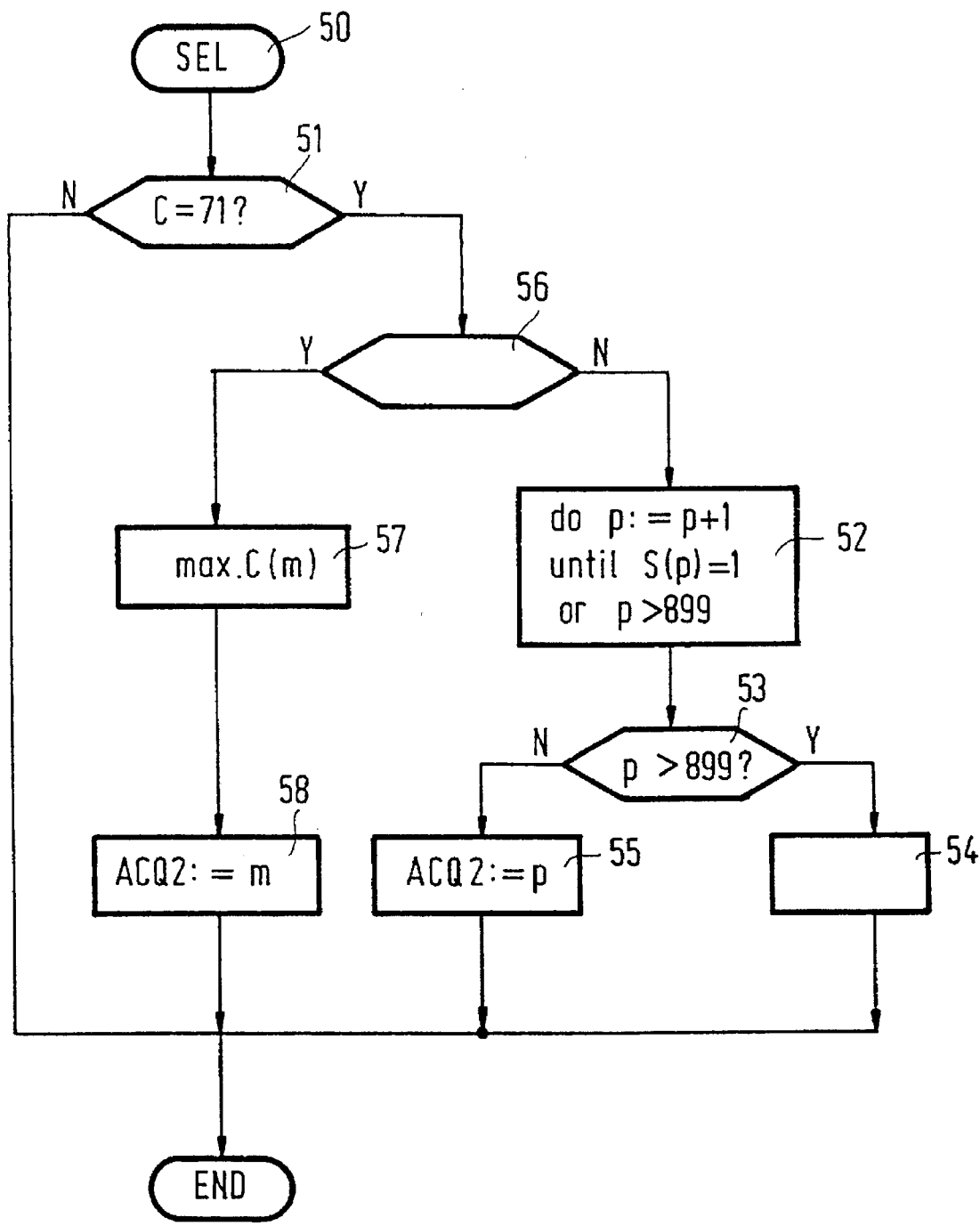

FIG. 8 shows a further embodiment of the selection program 50. This embodiment is distinguished from the other embodiments because steps 56–58 have been added. In step 56 it is checked whether the selection program is run through for the first time. If this is the case, the memory location m in which the counter C(m) has the largest value is searched in the step 57. In the step 58 the page having page number m is acquired and displayed. If the selection program is run through for a second or subsequent time, the other subtitling pages are selected. The steps 52–55 used for this purpose have already been explained. In this way the selection of the most frequently received subtitling page is given priority. Subsequently, possible other subtitling pages are successively called. If a television station now transmits, for example three subtitling pages 199, 299 and 399, of which 199 and 299 are static subtitling pages and 399 is actually active, page 399 will be displayed as the first page when the subtitle key is depressed.

Figure 9:
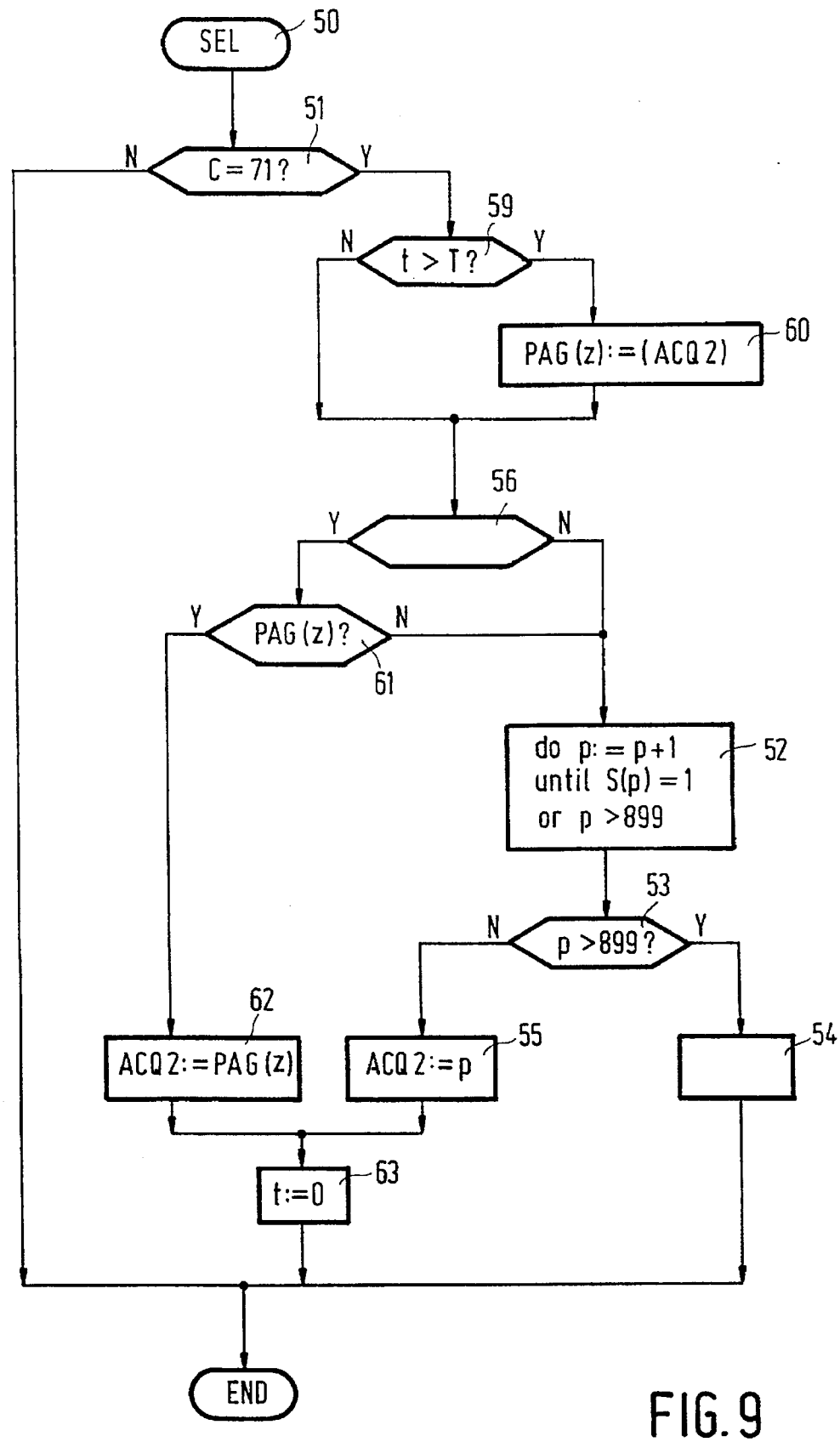

FIG. 9 shows the flow chart of a further embodiment of the selection program 50. This embodiment is adapted to store one or more subtitling page numbers PAG(z) for each receivable television transmitter z. To this end the receiver includes the non-volatile memory 122 which is shown in FIG. 3. In a step 59 of the selection program it is tested whether a timer t has reached a predetermined value T. It will initially be assumed that this is not the case because the timer has not started yet. In step 56 it is checked whether the subtitle key has been depressed for the first time so that the selection program is run through for the first time. If this is the case, it is checked in a step 61 whether a subtitling page number PAG(z) for the transmitter z to which the receiver is tuned is stored in the non-volatile memory. In a step 62 this page is acquired and displayed. If no page number is stored, or if the selection program is run through for a second or subsequent time, the subtitling pages found in the recognition program are successively selected in the previously described steps 52–55. In both cases the timer t is subsequently started in a step 63. The timer may not be started until the acquired page is actually displayed. The timer t thus represents the time during which a subtitling page is consulted by the user. If this is a short time, for example because the user rapidly browses through the available subtitling pages, the timer will not reach the predetermined value T. However, if a selected subtitling page is watched for a long time, the selected page number is apparently associated with the transmitter z to which the receiver is tuned. If the subtitling mode is left in this situation, the predetermined time T is exceeded and the page number consulted at that moment is preserved in the non-volatile memory. To this end the relevant page number is stored at the location PAG(z) of the non-volatile memory in a step 60.

If a receiver is tuned to the station NL3 and if the user has ultimately selected the subtitling page 399 via the pages 199 and 299, page 399 will be stored for the station NL3. When the user tunes to this station again, this page will subsequently be called with priority. In a corresponding manner, page 199 will be coupled to the station NL1 and page 299 will be coupled to the station NL2. In situations in which different page numbers are allocated to different languages, the receiver will automatically store the user's favorite language choice.

I claim:

1. A television receiver for receiving a composite video signal, said composite video signal including a plurality of video information signals and a plurality of teletext information signals, each of said teletext information signals stored as a teletext page, said receiver comprising:

recognition means for identifying all teletext pages within said composite video signal which correspond to a predetermined one of said video information signals;

selection means for selecting one of said identified teletext pages in response to a single control signal; and decoding means for decoding said selected teletext page.

2. The television receiver of claim 1, wherein at least one of said teletext information signals includes subtitling information.

3. The television receiver of claim 1, further including a memory and wherein said selection means selects between a plurality of page numbers stored in said memory and applies said selected page number to said decoding means.

4. The television receiver of claim 3, wherein said recognition means detects a recognition indicator of said identified subtitled teletext page and stores a page number corresponding to said identified teletext information signal in said memory.

5. The television receiver of claim 4, wherein said recognition means allocates a priority indication to said page number of a teletext information signal having a predetermined repetition frequency and wherein said selection means applies said page number having said priority indication to said decoding means.

6. The television receiver of claim 5, wherein said selection means generates a storage signal by displaying one of said teletext pages for a predetermined period of time.

7. The television receiver of claim 6, further including a further memory and wherein said selection means stores said page number of a displayed teletext page in said further memory in response to said storage signal and applies said page number to said decoding mean in response to said control signal.

8. The television receiver of claim 3, wherein said selection means generates a storage signal by displaying one of said teletext pages for a predetermined period of time.

9. The television receiver of claim 8, further including a further memory and wherein said selection means stores said page number of a displayed teletext page in said further memory in response to said storage signal and applies said page number to said decoding means in response to said control signal.

10. A television receiver for receiving a composite video signal, said composite video signal including non-video data and a plurality of video information signals, said receiver comprising:

recognition means for identifying the non-video data in said composite video signal which corresponds to a predetermined one of said video information signals;

selection means for selecting said identified non-video data in response to a single. control signal;

decoding means for decoding said selected non-video data; and display means for displaying the decoded non-video data.

11. A television receiver for receiving a composite video signal, said composite video signal including a plurality of video information signals and a plurality of teletext information signals, each of said teletext information signals stored as a teletext page, said receiver comprising:

a recognition cimuit for identifying all teletext pages within said composite video signal which correspond to a predetermined one of said video information signals;

a selection circuit for selecting one of said identified teletext pages in response to a single control signal; and a decoding circuit for decoding said selected teletext page.

12. A teletext decoder for receiving a composite video signal, said composite video signal including a plurality of video information signals and a plurality of teletext information signals, each of said teletext information signals stored as a teletext page, said decoder comprising:

a recognition circuit for identifying all teletext pages within said composite video signal which correspond to a predetermined one of said video information signals;

a selection circuit for selecting one of said identified teletext pages in response to a single control signal; and a decoding circuit for decoding said selected teletext page.

* * * * *